US012568343B2

(12) United States Patent
Sangston et al.

(10) Patent No.: US 12,568,343 B2
(45) Date of Patent: Mar. 3, 2026

(54) MONO INTERAURAL TIME DELAY (ITD) RENDERING

(71) Applicant: Sony Interactive Entertainment Inc., Tokyo (JP)

(72) Inventors: Brandon Sangston, San Mateo, CA (US); Calum Armstrong, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 112 days.

(21) Appl. No.: 18/664,636

(22) Filed: May 15, 2024

(65) Prior Publication Data

US 2025/0358582 A1 Nov. 20, 2025

(51) Int. Cl.
*H04S 7/00* (2006.01)
*H04S 1/00* (2006.01)

(52) U.S. Cl.
CPC .............. *H04S 7/302* (2013.01); *H04S 1/007* (2013.01); *H04S 2400/11* (2013.01); *H04S 2420/01* (2013.01)

(58) Field of Classification Search
CPC ...... H04S 7/302; H04S 1/007; H04S 2400/11; H04S 2420/01
USPC .......................................................... 381/303
See application file for complete search history.

(56) References Cited

U.S. PATENT DOCUMENTS

| | | | |
|---|---|---|---|
| 2008/0031462 A1 | 2/2008 | Walsh et al. | |
| 2019/0200159 A1 | 6/2019 | Park et al. | |
| 2020/0037091 A1 * | 1/2020 | Jeon | H04S 7/306 |
| 2021/0304730 A1 | 9/2021 | Ru | |

FOREIGN PATENT DOCUMENTS

| | | |
|---|---|---|
| CN | 102572676 A | 7/2012 |

OTHER PUBLICATIONS

International Search Report and Written Opinion issued in PCT/US2025/026510 dated Aug. 7, 2025, 9 pages.

* cited by examiner

*Primary Examiner* — Paul Kim
(74) *Attorney, Agent, or Firm* — Kilpatrick Townsend & Stockton LLP

(57) ABSTRACT

To reduce comb filtering in the ipsilateral when rendering binaural audio from plural virtual speakers on, for example, headphones, the ipsilateral delays of the ITDs of the respective speakers can be reduced to zero and the contralateral delays increased to maintain the same temporal length of the ITDs, shifting the delays to the less important contralateral ear.

20 Claims, 7 Drawing Sheets

MONO INTERAURAL TIME DELAY (ITD) RENDERING

FIELD

The present application relates generally to mono ITD rendering of sound.

BACKGROUND

Undesirable comb filtering effects can occur when rendering binaural sound simulated as coming from multiple virtual speakers.

SUMMARY

Present principles understand that the ipsilateral ear (the ear closest to the emulated sound source) can be more sensitive to comb filtering artifacts than the contralateral ear.

Accordingly, in a first aspect a method includes identifying at least first and second virtual sound sources for a computer simulation. The method also includes simulating respective first and second audio streams as being emitted by the respective first and second virtual sound sources for play on left and right speakers, e.g., speakers of headphones, and based at least in part on a geometry associated with the computer simulation, determining a first interaural time delay (ITD) for the first audio stream and a second ITD for the second audio stream. The method includes shifting at least one delay of the first ITD such that the first ITD has the same period of delay between delay associated with ipsilateral and delay associated with contralateral but a different distribution of delay between the ipsilateral and contralateral.

In example embodiments the first virtual sound source is not on an axis defined between ipsilateral and contralateral.

In some implementations the method includes playing the first and second audio streams using the ITDs on the respective left and right speakers, e.g., left and right headphone speakers.

In example embodiments the delay associated with the ipsilateral in the first ITD after shifting the delay distribution is less than the delay associated with the ipsilateral prior to the shift and the delay associated with the contralateral after shifting is changed to maintain a constant length ITD. Indeed, the delay associated with the ipsilateral ater shifting the delay distribution can be zero (0).

Similarly, if desired the method can include shifting a delay of the second ITD such that the second ITD has the same period of delay between delay associated with ipsilateral and delay associated with contralateral but with a different distribution of delay between the ipsilateral and contralateral. The second virtual sound source may not be on an axis defined between ipsilateral and contralateral, and the delay associated with the ipsilateral after the shift can be less than the delay associated with the ipsilateral prior to the shift. The delay associated with the contralateral after the shift is such so as to retain the same length ITD. Indeed, the delay associated with the ipsilateral after the shift can be zero (0).

In another aspect, an apparatus includes at least one processor assembly configured to, for at least first and second sound sources simulated as sourcing a same sound, determine respective first and second interaural time delays (ITD) based at least in part on respective geometric relationships between the respective first and second sound sources and left and right sound outputs. An axis is defined between the sound outputs, and at least one of the sound sources is not on the axis. In this aspect, each ITD includes a respective ipsilateral delay and a contralateral delay based on the geometric relationship. The first and second ITDs define respective first and second time periods between the respective ipsilateral delays and respective contralateral delays. The processor assembly is configured to reduce the ipsilateral delay of at least the first ITD and alter the contralateral delay of the first ITD such that the first time period remains unchanged and a time difference between the ipsilateral delay of the first ITD and the ipsilateral delay of the second ITD is reduced to render a modified first ITD. The processor assembly is configured to play the sound from the sound sources at the sound outputs, such as headphone speakers.

In another aspect, a device includes at least one computer memory that is not a transitory signal and that in turn includes instructions executable by at least one processor assembly to alter at least a first delay of at least a first interaural time delay (ITD) associated with a first sound source simulated as sourcing a sound to be closer to a first delay of a second ITD associated with a second sound source simulated as sourcing the sound to reduce comb filtering. The instructions are executable to play the sound from the first and second sound sources on at least first and second speakers.

The details of the present application, both as to its structure and operation, can be best understood in reference to the accompanying drawings, in which like reference numerals refer to like parts, and in which:

DETAILED DESCRIPTION

Figure 1:
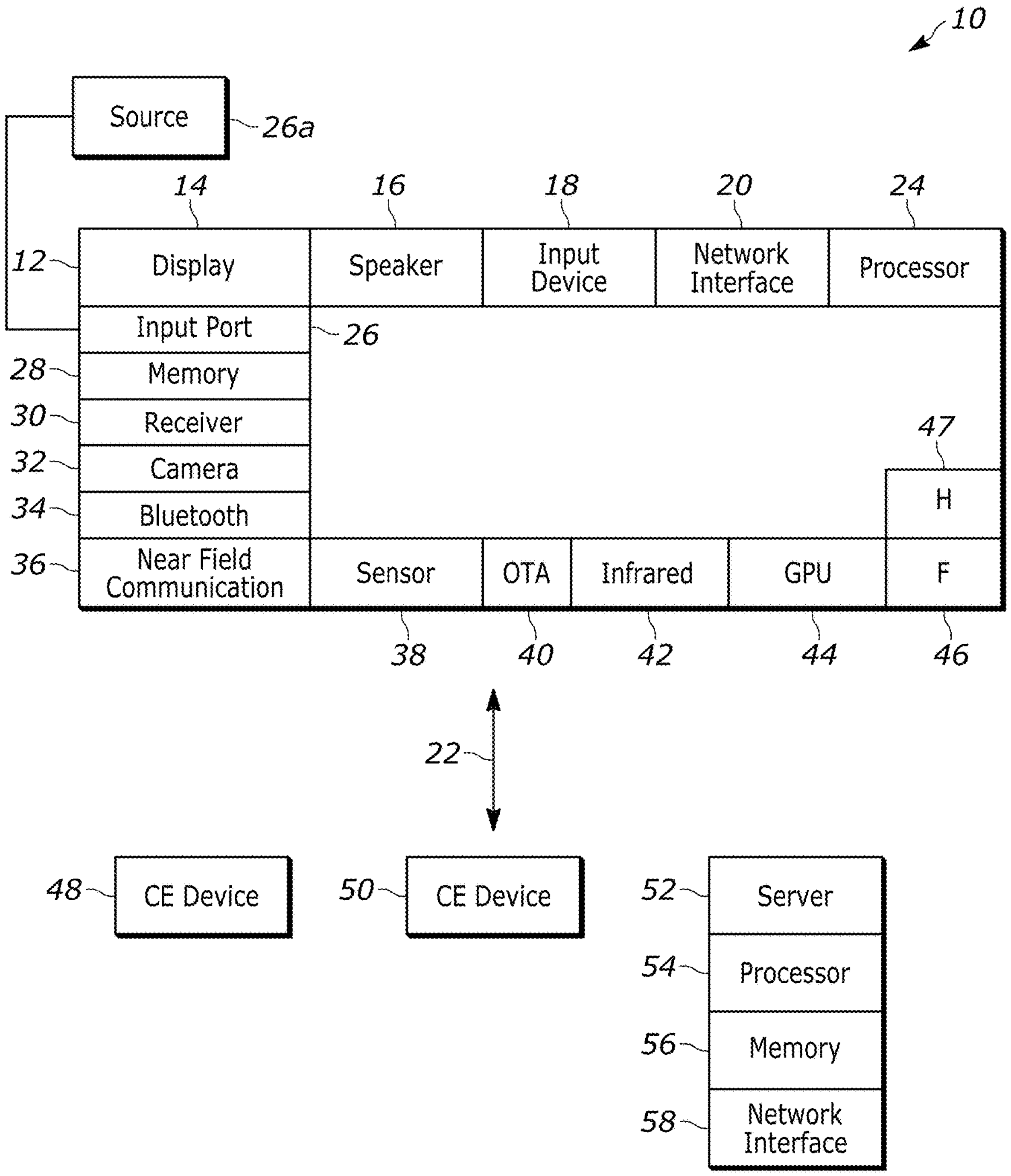
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
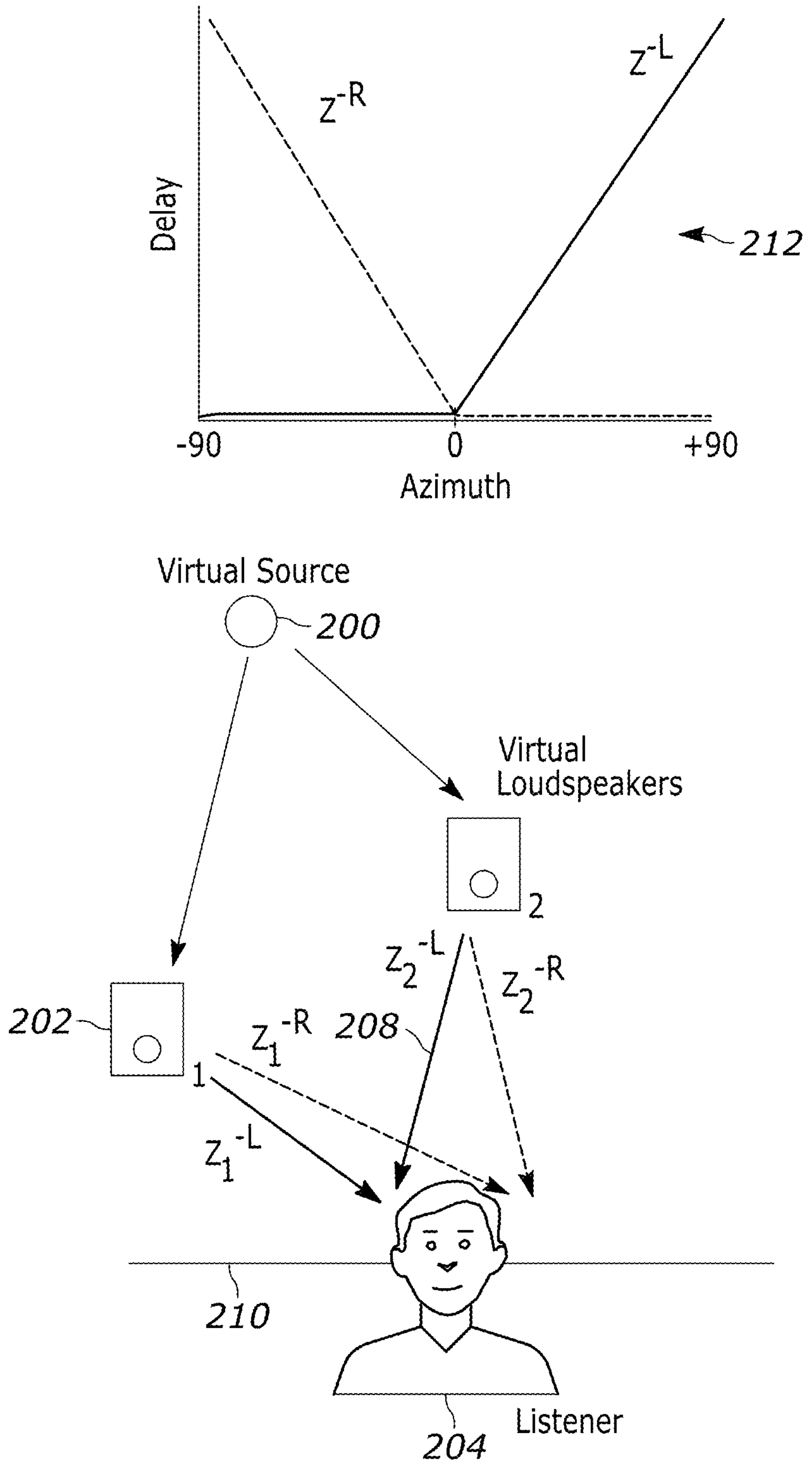
FIG. 2 illustrates an example virtual audio system.

Refer now to FIG. 2 for a general understanding of a technique for modifying the distribution of delay between sound output such as headphone speakers covering the ears, while retaining the relevant delay difference between the ears (Interaural Time-Delay or ITD).

When the same or substantially similar signal is output from multiple virtual sound sources (as is common with multichannel loudspeaker signals), multiple copies of the same or substantially similar signal are rendered with different delays. This accumulation of delayed copies results in comb filtering, which introduces intense notching across the frequency spectrum. In real life, the effects of comb filtering are often mitigated by environmental acoustic effects such as early reflections and reverberation. When artificially rendering these delays in isolation without acoustic effects, however, the comb filtering can be significantly more pronounced. This is the problem addressed by present principles.

FIG. 2 illustrates that a source 200 of virtual sound, such as a computer simulation such as a computer game engine, simulates sound as being generated by plural virtual speakers 202. For each speaker 202, the sound simulated as coming from it travels to both left and right sound outputs, in the example shown, to the left and right ears of a listener 204, e.g., via headphone speakers. The sound from each virtual speaker 202 traveling to the right ear is indicated by a respective right line 206 while the sound from each virtual speaker 202 traveling to the left ear is indicated by a respective left line 208. Both virtual speakers 202 in FIG. 2 are distanced from the axis 210 defined by the ears of the listener 204.

Sound traveling from the virtual speakers to the listener is delayed by the time it takes from being simulated to be emanated by the virtual speaker to travel to the listener. This may be thought of as "time of flight" (TOF) delay. In some computer simulations, TOF delay may be zeroed out.

In addition to TOF delay, for speakers that are not directly in front of the listener (e.g., according to the game geometry), the sound traveling to one ear must take a longer path than the sound traveling to the other ear and hence will arrive later in time. The difference in this small delay between the left and right ears that is added to TOF delay is a time period and may be referred to as "interaural time delay" (ITD). In FIG. 2, for the virtual speaker 202 directly in front of the listener 204, the ITD is zero because the sound from that virtual speaker arrives at each ear simultaneously. The left and right lines 206, 208 of that respective virtual speaker are of equal length and illustrate this. However, for the virtual speaker 202 that is closer to the left ear of the listener 204 (the ipsilateral ear for this geometry), the respective left line 208 is shorter than the respective right line 206, illustrating that sound arrives sooner at the left ear than the right ear (the contralateral ear). Because there is a difference in when the sound from the virtual speakers 202 arrives at the left ear and likewise because there is a difference in when the sound from speakers 202 arrives at the right ear, comb filtering artifacts can undesirably be heard by the listener 204 in both ears, absent present principles.

However, per present principles, the delays between ipsilateral and contralateral channels are redistributed, while retaining the overall ITD between the ears. The simple form of this is to render all time delays from all virtual speakers in the contralateral ear only, as shown in the graph 212 of FIG. 2 (showing delays for a single speaker for ease of illustration). For example, in real life, for a source on the left, a time delay of "x" ms might exist for sound traveling to the left ear and "y" ms for sound traveling to the right ear. In a binaural sound renderer, present principles may choose to implement this entire delay period in the right ear only. The delay difference between the ears is the same, but only the contralateral signal is delayed. This has the effect of ensuring that every sound source arrives exactly in phase/in time at the ipsilateral ear. This means there is no comb filtering present in the ipsilateral ear. Typically, signals will be louder in the ipsilateral ear due to geometric head shadowing effects, so it may be beneficial to prioritize the ipsilateral ear over the contralateral.

Although comb filtering in the contralateral ear may worsen, present principles understand that this may be acceptable by reducing or eliminating comb filtering in the ipsilateral, which is dominant. If this is undesirable for specific applications, delays may be proportionally redistributed in each ear. With respect to the example above, a −0.1 ms delay may be implemented to the left ear and +0.9 ms delay to the right ear. This ensures all sources arrive within 0.1 ms of each other within the ipsilateral which will significantly improve comb filtering in that ear, but it will not worsen comb filtering in the contralateral ear as much as in the case of the previous example.

In the graph 212 of FIG. 2, the delay to the left ear is equal to the maximum of (0, −ITD) while the delay to the right ear is equal to the maximum of (0, +ITD).

Figure 3:
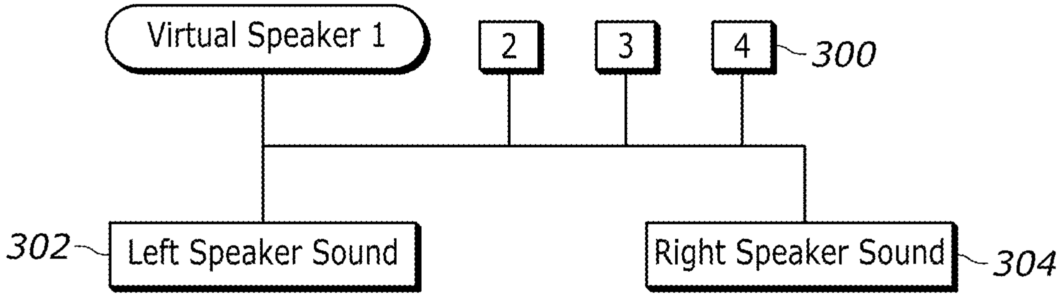
FIG. 3 illustrates additional details of an example virtual audio system.

FIG. 3 illustrates that present principles may be extended beyond two virtual speakers to plural (in the example shown, four) virtual speakers 300 to render binaural sound for play of the same sound simulated as emanating from all four speakers 300 on left and right speakers 302, 304, such as headphone speakers. Binaural audio includes two isolated sound streams, one to the left ear and one to the right ear, and as such can be thought of as two independent channels.

Note that aligning delays to prioritize one ear over another may not necessarily be limited to prioritizing the ipsilateral, and can include prioritizing the contralateral to reduce comb filtering in that ear depending on the circumstances and speaker geometric relationship to the left and right speakers.

Figure 4:
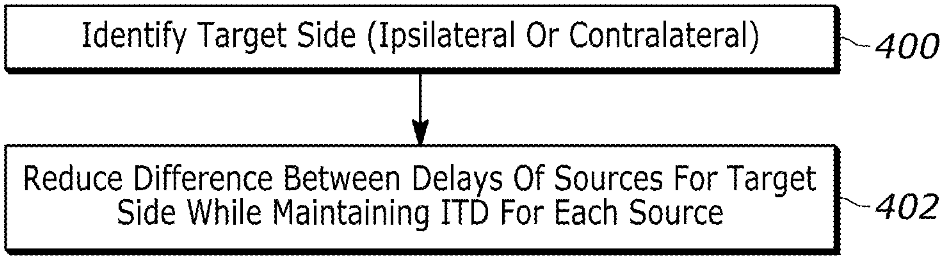
FIG. 4 illustrates example general logic in example flow chart format.

Accordingly, FIG. 4 illustrates generalized techniques consistent with present principles. As indicated at state 400, a target side to be prioritized in terms of reducing comb filtering is identified. For example, the ipsilateral side may be prioritized.

Moving to state 402, for the target side channels from the plural virtual speakers, the difference in delays in sound arrival from virtual speakers is reduced from the difference otherwise indicated by the unmodified ITD component data, e.g., as output by a head-related transfer function (HRTF) and as more fully discussed below, while the total ITD for each speaker is maintained unchanged. The difference in delays in sound arrival from virtual speakers may be reduced to zero for the target side. The difference may be reduced to zero for the target side by simply reducing the delay from each virtual speaker to zero for the target side.

Figure 5:
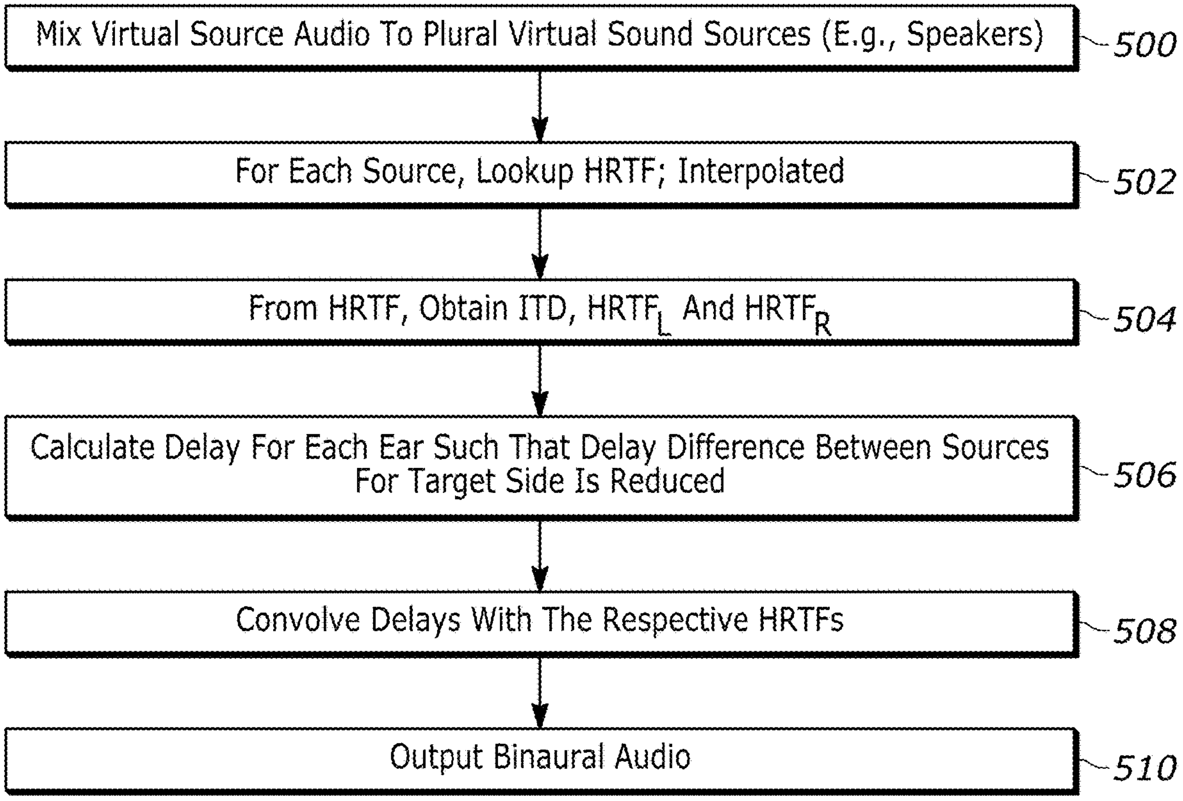
FIG. 5 illustrates example more specific logic in example flow chart format.

FIG. 5 illustrates more detail for specific examples. Commencing at state 500, virtual source audio is mixed to plural virtual sound sources such a virtual speakers. For each source, given its geometric relationship to the sound output (e.g., ears of the listener), state 502 indicates that an appropriate HRTF is looked up and if necessary interpolated if the source is between HRTF entries.

In an example, HRTF data may be thought of as a spherical mesh of filters for each ear, with a thousand (1000) HRTF entry points on the sphere. The point on the sphere closest to the speaker or other sound source is selected and the corresponding HRTF identified. At state 504, from the HRTF the HRTF for the left channel and HRTF for the right channel is obtained along with the ITD between the channels.

Moving to state 506, the delay for each ear is calculated such that the delay difference between sound arrival from virtual sources for the target side (e.g., ipsilateral) is reduced, e.g., to zero. The delays are convolved with the respective HRTFs at state 508 and accumulated, then converted to binaural audio at state 510 for play on left and right speakers, e.g., of a headphone worn by a listener. Or, the binaural sound may be output over stereo TV speakers in which crosstalk cancellation may be performed on a binaurally rendered signal as a post-process to deliver the isolated left/right channels to the listener's left/right ears.

Thus, the ITD offset is parametrized by the position or direction of the respective virtual source. So, each sound source being rendered will have an associated ITD, derived from the HRTF data. The ITD just encodes the time of arrival difference between the L/R ears in a particular direction. So, for each virtual source, the ITD must be converted into an actual delay (time offset) for each ear. Present principles simply convert the ITD to delay for each ear in a manner to minimize comb filtering in the target ear.

Figure 6:
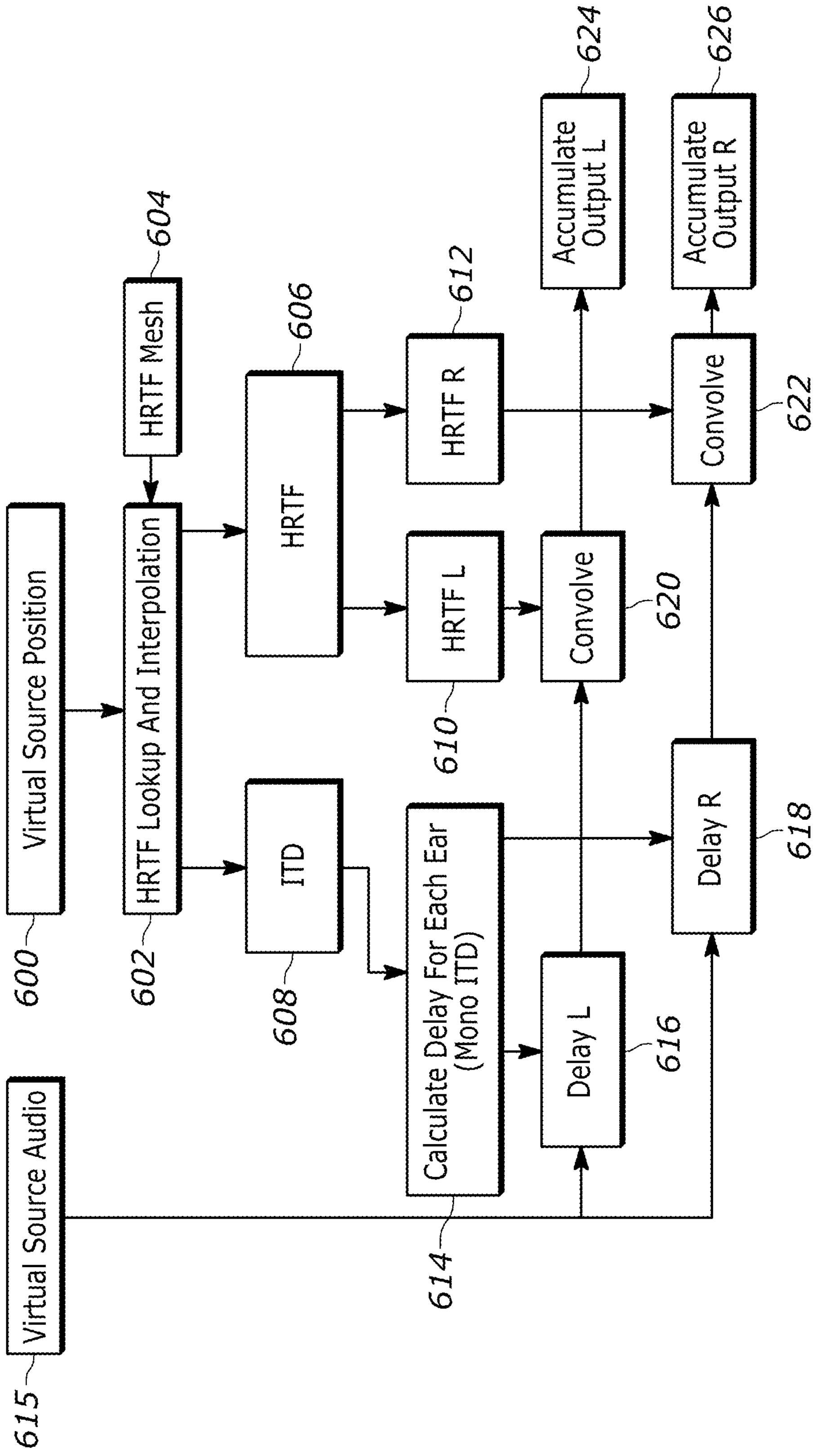
FIG. 6 illustrates example signal processing flow for a generic case of rendering plural virtual sources.

FIG. 6 further illustrates in the context of data flow for a binaural renderer for a single virtual source for ease of description. Using the position 600 of the virtual source, HRTF is looked up and interpolated at 602 from a HRTF mesh of spherical points 604. HRTF filter data 606 is identified along with the ITD 608 according to the source's position. From the HRTF filter data 606, left and right HRTFs 610, 612 are derived.

As also shown, from the ITD 608, the delay for at least one source for each ear is calculated at 614 according to present principles, producing a stereo copy of the mono input signal 615, with differing delays 616, 618 in each ear which are respectively convolved at 620 and 622 with the respective HRTF 610, 612 and accumulated at 624, 626 for each ear. Thus, the ITD is rendered for each source, and the comb filtering sought to be mitigated for the target side (e.g., ipsilateral) is a result of the accumulation at 624, 626.

Figure 7:
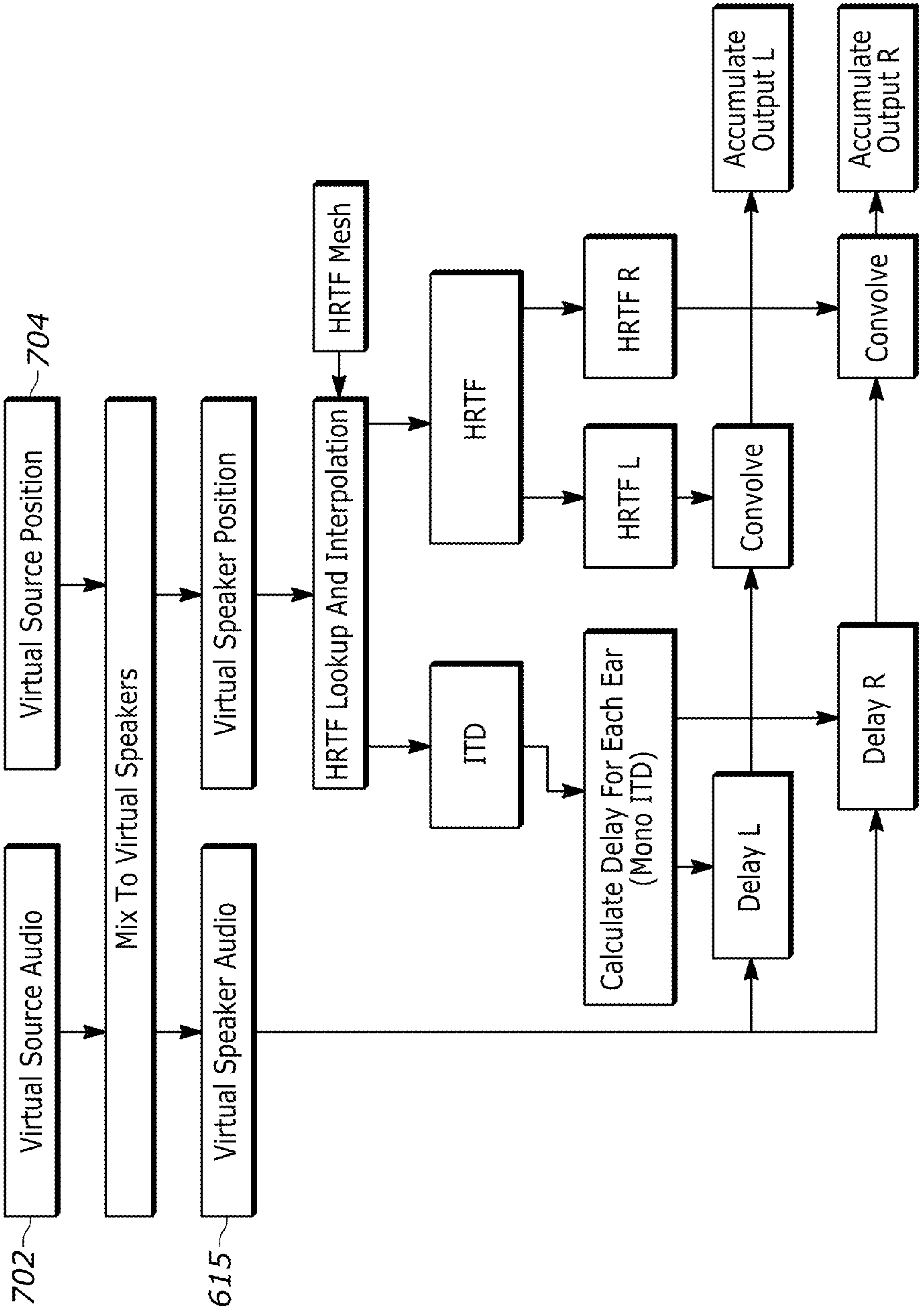
FIG. 7 illustrates example signal processing flow for a specific case of rendering virtual speakers to mitigate comb filtering.

FIG. 7 illustrates signal flow substantially similar to FIG. 6 except that FIG. 7 illustrates a use case of rendering virtual speakers to mitigate comb filtering in which virtual source audio 700 and virtual source position 702 is mixed 704 to plural virtual speakers. The mix 704 is used as input to the virtual source audio 615 and virtual source position 600 shown in FIG. 6 and signal processing then ensues as described in the case of FIG. 6.

Figure 8:
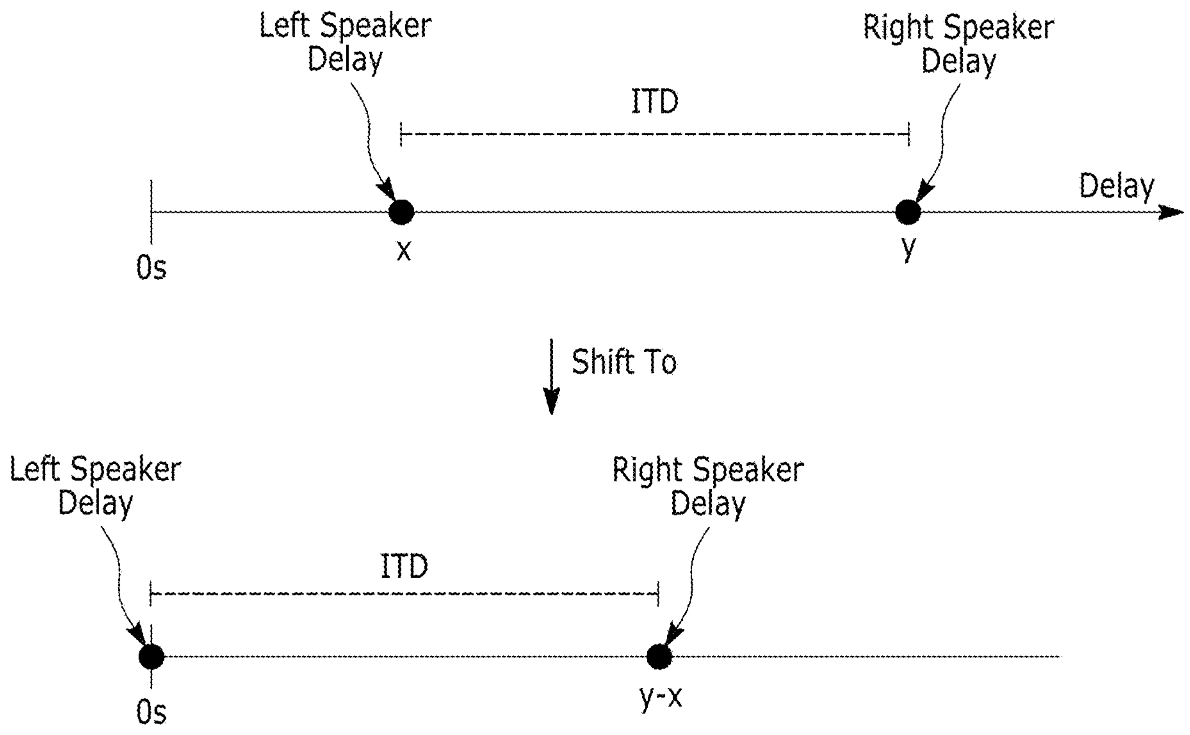
FIG. 8 graphically illustrates shifting delays while maintaining duration of an ITD.

In effect, the delays from each virtual speaker to the target ear, e.g., ipsilateral, are shifted to be more equal to each other (with a difference approaching or equaling zero) to reduce comb filtering in the target ear. FIG. 8 illustrates this, assuming that the left channel is the target channel. The top graph 800 illustrates a left channel delay of x milliseconds and a right channel delay of y ms for a total ITD of x minus y for a single virtual speaker. Present principles are applied to shift the left channel delay to be zero and the right channel delay to be y−x, maintaining the same time period of the ITD as before the shift. In the example of FIG. 8, the same operation is performed on each virtual speaker, meaning that the left channel delay is eliminated for each virtual speaker and the right channel delay increased for each virtual speaker while maintaining the total ITD for each speaker unchanged.

In an alternate embodiment, instead of implementing present principles in a binaural renderer, the source computer simulation itself can add delay to lateral sources to be the same delay as a frontal source to obtain constant delays per hemisphere or quarter hemisphere, for instance. This would allow shaping of the delay/comb filtering behavior without direct modification to the HRTF.

In yet another alternate embodiment, a ML model may be trained on ground truth delay differences between plural virtual speakers and a target channel along with subjective ground truth tags input by, e.g., human experts for each difference indicating the severity of the comb filtering associated with that difference. The audio frequencies and relative speaker locations for each data point may also be input with the training set. The ML model once trained subsequently can be used to adjust delays in the target channel consistent with principles above given the frequencies and relative speaker locations of the geometry and audio of a computer game.

While the particular embodiments are herein shown and described in detail, it is to be understood that the subject matter which is encompassed by the present invention is limited only by the claims.

What is claimed is:

1. A method comprising:

identifying at least first virtual sound source and a second virtual sound source for a computer simulation;

simulating respective first and second audio streams as being emitted by the respective first and second virtual sound sources for play on a left speaker and a right speaker;

based at least in part on a geometry associated with the computer simulation, determining a first interaural time delay (ITD) for the first audio stream and a second ITD for the second audio stream; and shifting a delay distribution of at least the first ITD to be a modified first ITD, the modified first ITD having a same period of delay between delay associated with ipsilateral and delay associated with contralateral as the first ITD, the first modified ITD having a different distribution of delay between the ipsilateral and contralateral than the first ITD.

2. The method of claim 1, wherein the first virtual sound source is not on an axis defined between ipsilateral and contralateral.

3. The method of claim 1, comprising playing the respective first and second audio streams using the modified first ITD and the second ITD on the left speaker and the right speaker, respectively.

4. The method of claim 1, wherein the delay associated with the ipsilateral in the modified first ITD is less than the delay associated with the ipsilateral in the first ITD and the delay associated with the contralateral in the modified first ITD is altered to maintain a constant ITD.

5. The method of claim 4, wherein the delay associated with the ipsilateral in the modified first ITD is zero (0).

6. The method of claim 1, comprising:

shifting a second delay distribution of the second ITD to be a modified second ITD, the second modified ITD having a same period of delay between delay associated with ipsilateral and delay associated with contralateral as the second ITD, the second modified ITD having a different distribution of delay between the ipsilateral and contralateral than the second ITD.

7. The method of claim 6, wherein the second virtual sound source is not on an axis defined between ipsilateral and contralateral.

8. The method of claim 6, wherein the delay associated with the ipsilateral in the modified second ITD is less than the delay associated with the ipsilateral in the second ITD and the delay associated with the contralateral in the modified second ITD is altered to maintain a constant ITD.

9. The method of claim 8, wherein the delay associated with the ipsilateral in the modified second ITD is zero (0).

10. An apparatus comprising:

at least one processor assembly configured to:

for at least a first sound source and a second sound source simulated as sourcing a same sound, determine respective first interaural time delay (ITD) and a second ITD based at least in part on respective geometric relationships between the respective first sound source and the second sound source and a left sound output and a right sound output, an axis being defined between the left sound output and the right sound output, at least one of the left sound source or the right sound source not being on the axis, each ITD comprising a respective ipsilateral delay and a contralateral delay based on the geometric relationship, the first ITD and the second ITD defining a first time period and a second time period between the respective ipsilateral delays and respective contralateral delays;

reduce the ipsilateral delay of at least the first ITD and alter the contralateral delay of the first ITD such that the first time period remains unchanged and a time difference between the ipsilateral delay of the first ITD and the ipsilateral delay of the second ITD is reduced to render a modified first ITD; and play the sound from the left sound source and the right sound source at the left sound output and the right sound output.

11. The apparatus of claim 10, wherein the left sound output and the right sound output comprise left and right speakers, respectively.

12. The apparatus of claim 10, wherein the sound comprises binaural sound.

13. The apparatus of claim 10, wherein the processor assembly is configured to:

reduce the ipsilateral delay of the second ITD and alter the contralateral delay of the second ITD such that the second time period remains unchanged.

14. The apparatus of claim 13, wherein the processor assembly is configured to:

reduce the ipsilateral delays of the first ITD and the second ITD to zero (0).

15. The apparatus of claim 10, wherein the first sound source and the second sound source are virtual sound sources.

16. A device comprising:

at least one computer memory that is not a transitory signal and that comprises instructions executable by at least one processor assembly to:

alter at least a first delay of at least a first interaural time delay (ITD) associated with a first sound source simulated as sourcing a sound to be closer to a first delay of a second ITD associated with a second sound source simulated as sourcing the sound to reduce comb filtering; and play the sound from the first sound source and the second sound source on at least a first speaker and a second speaker.

17. The device of claim 16, wherein the first sound source and the second source comprise virtual sound sources.

18. The device of claim 16, wherein the at least first delay comprises multiple delays comprising respective ipsilateral delays and the instructions are executable to:

alter a contralateral delay of the first ITD such that a temporal length of the first ITD remains unchanged.

19. The device of claim 16, wherein the at least first delay comprises multiple delays comprising respective ipsilateral delays and the instructions are executable to:

reduce the ipsilateral delays to zero (0).

20. The device of claim 16, comprising the at least one processor assembly.

* * * * *